United States Patent Office 3,211,731
Patented Oct. 12, 1965

---

3,211,731
PYRAZOLO-PYRIMIDINES AND PROCESS FOR PREPARING SAME
Paul Schmidt, Therwil, and Kurt Eichenberger and Max Wilhelm, Basel, Switzerland, assignors to Ciba Corporation, a corporation of Delaware
No Drawing. Filed May 5, 1961, Ser. No. 107,906
Claims priority, application Switzerland, May 11, 1960, 5,403/60; Apr. 4, 1961, 3,928/61, 3,930/61, 3,931/61
The portion of the term of the patent subsequent to Feb. 16, 1982, has been disclaimed
33 Claims. (Cl. 260—256.4)

The present invention relates to the manufacture of pyrazolo[3,4-d]pyrimidines of the formula

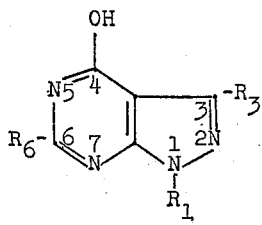

or its tautomeric forms, and salts of these compounds. In the above formula $R_1$ represents hydrogen, an alkyl, hydroxy-alkyl, halogen-alkyl or oxa-alkyl radical, a cycloalkyl, cycloalkylalkyl, aralkyl, heterocyclyl-alkayl radical or an at most binuclear aryl or heterocyclic radical. Examples of such substituents are lower alkyl radicals, such as methyl, ethyl, propyl, isopropyl, butyl, isobutyl, pentyl-(1), pentyl-(2), pentyl-(3), 2-methylbutyl-(3) or hexyl radicals, 3-oxa-pentyl- or 5-oxa-heptyl-(2) radicals, hydroxy-lower alkyl or halogen-lower alkyl radicals, such as hydroxy-ethyl or chlorethyl radicals, cyclopentyl or cyclohexyl radicals, cyclopentyl- or cyclohexyl-methyl, -ethyl or -propyl radicals, phenyl-alkyl, such as 1- or 2-phenylethyl or phenylmethyl, or phenyl radicals in which the aromatic nuclei may bear substituents, for example lower alkyl or free or substituted hydroxyl, amino or mercapto groups, halogen atoms, trifluoromethyl or nitro groups, or if desired correspondingly substituted mono-nuclear heterocyclic or heterocyclylalkyl radicals, such as pyridyl, thienyl, furyl, thenyl or furfuryl radicals. In the aforementioned substituted hydroxyl, mercapto of amino groups, the substituents are preferably those of the aforementioned kind, above all lower alkyl radicals, these groups therefore being for example methoxy, ethoxy, propoxy, butoxy, corresponding alkylmercapto groups, alkylenedioxy groups, such as methylenedioxy groups, mono- or di-alkylamino groups, such as mono- or di-methyl, -ethyl-, -propyl-, -butyl- or -pentyl-amino groups. As halogen atoms there may be mentioned more especially fluorine, chlorine or bromine.

$R_3$ stands for hydrogen, or in the second place, for a lower alkyl radical, for example one of those mentioned above for $R_1$, particularly methyl.

$R_6$ represents a possibly substituted aralkyl or heterocyclylalkyl radical in which the alkyl radicals are for example lower alkyl radicals, such as methyl, ethyl, propyl or butyl radicals. $R_6$ is, for example, a phenylalkyl radical, such as 1- or 2-phenylethyl, 1-phenylpropyl or phenylmethyl radical in which the aromatic nuclei may bear substituents, such as lower alkyl or free or substituted hydroxyl, amino or mercapto groups, halogen atoms, trifluoromethyl or nitro groups, or possibly correspondingly substituted mononuclear heterocyclyl-alkyl radicals, such as pyridylmethyl, thenyl or furfuryl radicals. The alkyl radicals of the aralkyl or heterocyclyl-alkyl radicals may also be substituted, for example by one of the aforementioned aryl or heterocyclic radicals, such, for example as in the diphenylmethyl radical. Substituted hydroxyl, mercapto or amino groups as the phenyl radicals are, for example, those mentioned above for $R_1$, more especially lower alkoxy groups, such as methoxy, ethoxy, propoxy, butoxy or methylenedioxy, methyl-mercapto or dimethyl-amino groups; a preferred halogen atom is a chlorine or bromine atom.

Another object of the invention are the pyrazolo[3,4-d]pyrimidines of the formula

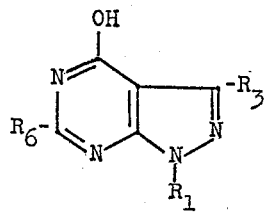

or its tautomeric forms, and salts of these compounds, and their manufacture. In this formula $R_1$ represents an alkyl, halogenalkyl or oxa-alkyl radical, a cycloalkyl, cycloalkylalkyl, aralkyl or heterocyclylalkyl radical such as those shown above for $R_1$, $R_3$ has the meaning given above and $R_6$ stands for an alkyl radical, such as a lower alkyl radical, e.g. methyl, ethyl, propyl, isopropyl, butyl, isobutyl, pentyl-(1), pentyl-(2) or pentyl-(3), with the proviso that in a 1,6-dialkyl compound at least one of the alkyl radicals in 1- and 6-position contains more than 2 carbon atoms.

The new compounds have valuable pharmacological properties. More especially they have a coronary dilatating action. The new compounds may be used as medicaments, particularly in circulatory disturbances of the myocardium, but also as intermediate products for the preparation of such medicaments.

Especially valuable as coronary dilatating agents are compounds of the formula

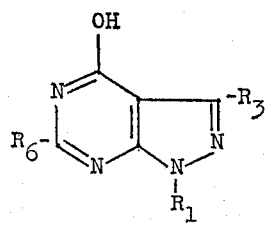

and its tautomeric forms and the salts thereof, in which $R_1$ represents a hydrogen atom or a lower alkyl group, for example, methyl, ethyl, propyl, isopropyl, butyl-(2), 3-methyl-butyl-(2), pentyl-(2), pentyl-(3), cycloalkyl, for example cyclopentyl or cyclohexyl, hydroxy-lower alkyl, such as hydroxy ethyl, halogen-lower alkyl, such as chlor-ethyl, oxa-lower alkyl, such as 3-oxapentyl, or an aryl such as a phenyl radical; the aryl radical may be unsubstituted or mono-, di- or tri-substituted by halogen, such as chlorine or bromine, alkoxy, such as methoxy, or ethoxy, alkyl, such as methyl, ethyl, propyl, isopropyl, butyl, tertiary butyl, methylenedioxy, trifluoromethyl, nitro or amino groups, or it may represent a pyridyl radical, $R_3$ represents a hydrogen atom or lower alkyl and $R_6$ an aralkyl, such as a phenylalkyl, above all a phenylmethyl radical; the aryl radicals may be substituted as defined above.

Especially valuable are furthermore, compounds of the formula

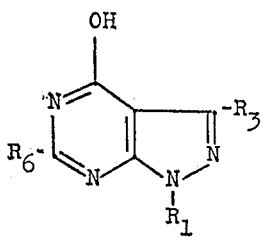

as well as their tautomers and salts thereof, in which $R_1$ stands for a lower alkyl radical, $R_3$ for a lower alkyl radical or especially hydrogen and $R_6$ for an unsubstituted benzyl radical or a benzyl radical mono-, di- or tri-substituted at the phenyl radical by chlorine, methoxy, methylenedioxy, methyl or trifluoromethyl, as well as the compounds of the formula

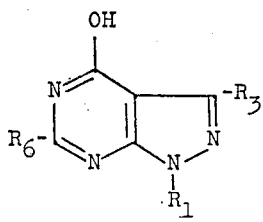

their tautomers and salts thereof, in which $R_1$ stands for lower alkyl, e.g., methyl, ethyl, propyl, isopropyl, butyl-(2), 3-methyl-butyl-(2), pentyl-(2) or pentyl-(3), cycloalkyl, e.g., cyclopentyl or cyclohexyl, halogen-lower alkyl, such as chloroethyl or oxa-lower alkyl, such as 3-oxa-pentyl, $R_3$ for hydrogen or lower alkyl and $R_6$ for lower alkyl, with the proviso that in 1,6-dialkyl compounds at least one of the alkyl radicals in 1 and 6-position contains more than 2 carbon atoms.

There may be mentioned more especially; 1-isopropyl-4 - hydroxy-6-p-chlorobenzyl-pyrazolo[3,4-d]pyrimidine, 1 - isopropyl-4-hydroxy-6-m-methoxybenzylpyrazolo[3,4-d]pyrimidine, 1 - isopropyl-4-hydroxy-6(3':4':5'trimethoxy-phenyl-methyl) - pyrazolo[3,4-d]pyrimidine, 1-pentyl-(3') - 4 - hydroxy-6-benzyl-pyrazolo[3,4-d]pyrimidine, 1-isopropyl - 4 - hydroxy-6-ethyl-pyrazolo[3,4-d]pyrimidine and above all the 1 - isopropyl-4-hydoxy-6-benzyl-pyrazolo[3,4-d]primidine, and their salts.

The new compounds are obtained in a manner known per se, for example, by reacting a 2-$R_1$-3-amino-5-$R_3$-pyrazole-4-carboxylic acid ester with a carboxylic acid of the formula $R_6$—COOH in the form of its amide or nitrile, or reacting a 2-$R_1$-3-amino-5-$R_3$-pyrazole-4-carboxylic acid amide with the carboxylic acid of the formula $R_6$—COOH in the form of its anhydride or amide or with a corresponding halide or nitrile.

The reaction may also be performed by first acylating the amino group of the 3-amino-2-$R_1$-pyrazole-5-$R_3$-4-carboxylic acid amide with the carboxylic acid of the formula $R_6$COOH in the form of its anhydride or halide, and in the second reaction step the ring is closed.

The condensation of the aminopyrazoles or, if desired of the acylated aminopyrazoles to the pyrazolo-pyrimidines, is preferably carried out at a raised temperature, if desired in the presence of a diluent and/or condensating agent, under atmospheric or superatmospheric pressure. In this connection it has been surprisingly found that it is very advantageous to perform the reaction with the use of a 2-$R_1$-3-amino-5-$R_3$-pyrazole 4-carboxylic acid ester, for example the alkyl ester, and of a nitrile of the formula $R_6$—CN, using a condensing agent, preferably an alkali metal, for example sodium, if desired in the form of its amide, hydride or of an alcoholate, or another strong base, such as trimethylbenzyl-ammonium hydroxide and a diluent such as benzene, toluene, xylene or an ether.

The invention also includes any modification of the process in which an intermediate product obtained at any stage of the process is used as starting material and the remaining process steps are carried out, or the process is discontinued at any stage, or at any stage of the reaction necessary substituents are introduced, or in which the starting materials or intermediates are formed in the course of the reaction. Of special importance is that modification of the process in which the 2-$R_1$-3-amino-5-$R_3$-pyrazole-4-carboxylic acid amide is replaced by a derivative convertible thereinto, for example the nitrile, and the latter is converted into the amide after the reaction with the derivative of the acid $R_6$COOH for example by treatment with an alkali in the presence of an oxidizing agent, such as hydrogen peroxide, with or without isolation of the intermediate product formed in this reaction, and the ring is then closed to form the 4-hydroxy-pyrazolo[3,4-d]pyrimidine. Another process in which an intermediate product is formed under the reaction conditions is, for example the reaction of a compound of the formula

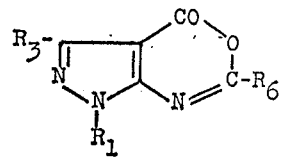

with ammonia, the acid amide being formed intermediarily. These oxazines are obtained, for example, by eliminating water from 2-$R_1$-3-($R_6$—CONH)-4-carboxy-pyrazoles, for example by means of an anhydride, such as acetic anhydride. In the resulting compounds substituents may be converted into one another within the groups mentioned. For example a nitrophenyl group may be reduced in conventional manner to an aminophenyl group or a phenyl radical nitrated.

The above reactions are preformed in the ordinary manner, if desired in the presence of a diluent and/or condensing agent and/or catalyst, at ordinary temperature or if desired a raised temperature.

The resulting hydroxy compounds may be converted in the ordinary manner into their therapeutically acceptable salts with bases, e.g., metal salts, such as alkali metal salts, for example sodium or potassium salts, for example by treatment with a corresponding base, e.g., an alkali metal hydroxide. The salts may be converted into the free hydroxy compounds, advantageously by treatment with acids.

The new, pharmacologically valuable compounds and their salts may be used, for example, in the form of pharmaceutical preparations. The latter contain the above compounds in admixture with an organic or inorganic pharmaceutical excipient suitable for enteral or parenteral administration. Suitable excipients are substances which do not react with the new compounds, for example gelatine, lactose, starches, magnesium stearate, talc, vegetable oils, water, benzyl alcohols, gums, polyalkyleneglycols, cholesterol or any other known excipient. The pharmaceutical preparations may be, for example tablets or dragees or in liquid form as solutions, suspensions or emulsions. They may be sterilized and/or contain assistants, such as preservatives, stabilizers, wetting or emulsifying agents. They may also contain other therapeutically valuable substances. The preparations are formulated by the usual methods. They contain, for example 5 to 50 mg., preferably 10 mg. of the active substance per dosage unit, and about 1 to 70%, preferably 5 to 50% of active substance.

The final products of the present process are also valuable intermediate products, for example for the manufacture of 4-thiono, 4-mercapto or 4-amino compounds described in our copending patent applications Ser. No. 107,907 and Ser. No. 107,916 of even date herewith.

Application Serial No. 107,907 issued into U.S. Patent No. 3,169,965 on February 16, 1965, and application Serial No. 107,916 is now abandoned.

It is possible, for example, to replace a hydroxyl group in position 4 of 1-$R_1$-3-$R_3$-6-$R_6$-pyrazolo[3,4-d]-pyrimidines by a halogen atom, such as chlorine or bromine, for example by treatment with a halide of phosphoric acid, such as phosphorous oxychloride or phosphorus pentachloride, or to convert it into a free mercapto group in the customary manner, for example by treatment with phosphorus pentasulfide. In a resulting 4-halogeno compound the halogen can be exchanged in the customary manner, for example by reaction with thiourea, a metal salt of hydrogen sulfide or a mercaptan, or with ammonia, an amine or hydrazine. Free mercapto groups may me substituted as shown above and free or substituted mercapto groups replaced by corresponding groups by reaction with ammonia, an amine or hydrazine.

Any new starting material used in the present process may be prepared by a conventional method known per se. The invention also includes the new starting materials and intermediate products and their preparation.

Preferred starting materials for use in the present invention are those which yield the final products described above as being particularly valuable. If desired, the starting materials may be used in the form of their salts.

The following examples illustrate the invention:

Example 1

2.3 grams of sodium are finely distributed in 50 cc. of benzyl cyanide and 9.9 grams of 2-isopropyl-3-amino-4-carbethoxy-pyrazole are added. The mixture is then heated with stirring for 4 hours at 110–120° C., allowed to cool, treated with 100 cc. of alcohol and evaporated to dryness under vacuum. The residue is taken up in 150 cc. of 2 N-sodium hydroxide solution, the alkaline solution is freed from undissolved material by being extracted with chloroform and then adjusted with 6 N-hydrochloric aicd to pH 5–6, whereupon a solid product precipitates which is recrystallized from a small amount of alcohol, to yield 1-isopropyl-4-hydroxy-6-benzyl-pyrazolo[3,4-d]pyrimidine of the formula

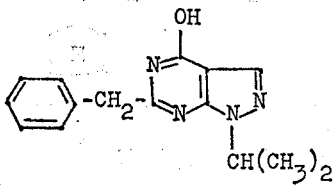

in colorless crystals melting at 165–166° C.

Example 2

16.8 grams of 2-isopropyl-3-amino-4-carbonamido-pyrazole are refluxed for 10 hours in 60 cc. of benzyl cyanide, allowed to cool and then considerably concentrated under vacuum. The residue is treated with 2 N-sodium hydroxide solution and extracted twice with chloroform. The alkaline aqueous solution is treated with carbon and filtered. The filtrate is adjusted with 5 N-hydrochloric acid to pH 6, whereupon the 1-sopropyl-4-hydroxy-6-benzylpyrazolo[3,4-d]pyrimidine described in Example 1 precipitates.

Example 3

A solution of 8.5 grams of 2-methyl-3-amino-4-carbethoxy-pyrazole in 50 cc. of benzyl cyanide is treated with 2.3 grams of sodium in small pieces and the whole is then heated with stirring to 110–120° C. After 4 hours the reaction mixture is cooled and treated with 100 cc. of ethanol. The solution is evaporated to dryness under vacuum. The residue is treated with 150 cc. of 2 N-sodium hydroxide solution and the excess benzyl cyanide is extracted with chloroform. The aqueous phase is adjusted with 5 N-hydrochloric acid to pH 5–6, whereupon a solid precipitates forms which is filtered off and repeatedly recrystallized from ethanol, to yield 1-methyl-4-hydroxy-6-benzyl-pyrazolo-[3,4-d]pyrimidine of the formula

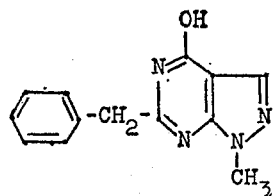

in crystals melting at 236–237° C.

Example 4

A mixture of 8.5 grams of 2-methyl-3-amino-4-carbethoxy-pyrazole and 50 grams of 3,4,5-trimethoxy-benzyl cyanide is heated to 110° C. and 2.3 grams of sodium in small pieces are stirred in. After 4 hours the reaction mixture is cooled, treated with 150 cc. of ethanol and then evaporated under vacuum. The residue is treated with 150 cc. of 2 N-sodium hydroxide solution and extracted with chloroform. The aqueous phase is separated and adjusted with 5 N-hydrochloric acid to pH 5–6. The resulting precipitate is recrystallized from chloroform+petroleum ether, to yield 1-methyl-4-hydroxy-6-(3′,4′,5′ - trimethoxy - phenyl - methyl) - pyrazo[3,4-d]-pyrimidine of the formula

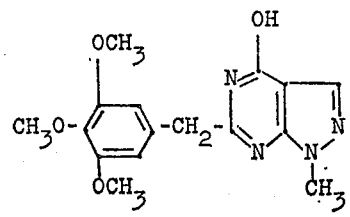

in crystals melting at 245° C.

Example 5

A mixture of 50 grams of 3,4,5-trimethoxy-benzyl cyanide and 9.9 grams of 2-isopropyl-3-amino-4-carbethoxy-pyrazole is heated to 80° C. and 2.3 grams of sodium in small pieces are then added. The mixture is heated for 4 hours at 110–120° C., allowed to cool, the excess sodium is destroyed with alcohol and the whole is evaporated to dryness under vacuum. The residue is taken up in 200 cc. of 2-N-sodium hydroxide solution and extracted with 200 cc. of chloroform to remove excess trimethoxy-benzyl cyanide. The aqueous alkaline solution is treated with active carbon and filtered. The clear filtrate is adjusted with 5 N-hydrochloric acid to pH=6, whereupon 1-isopropyl -4-hydroxy-6-(3′,4′,5′-trimethoxy-phenyl-methyl)-pyrazolo[3,4-d]pyrimidine of the formula

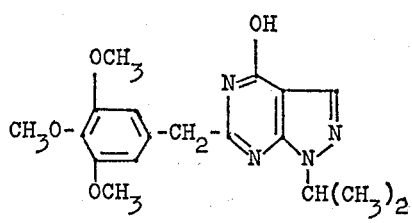

settles out; after recrystallization from alcohol it melts at 195–196° C.

Example 6

A mixture of 30 grams of para-ethoxybenzyl cyanide and 9.9 grams of 2-isopropyl-3-amino-4-carbethoxy-pyrazole is heated to 60° and 2.3 grams of sodium in small pieces are then added. The mixture is heated for 4 hours at 110–120° C., allowed to cool, the excess sodium is destroyed with alcohol and the whole is evaporated to dryness under vacuum. The residue is taken up in 200 cc. of 2 N-sodium hydroxide solution and extracted with 200 cc. of chloroform to remove excess ethoxy-benzyl cyanide. The aqueous alkaline solution is treated with active carbon and filtered. The clear filtrate is adjusted with 5 N-hydrochloric acid to pH=6, whereupon 1-isopropyl 4-hydroxy-6-para-ethoxybenzyl-pyrazolo[3,4-d]-pyrimidine of the formula

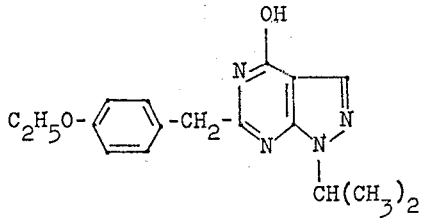

settles out; after recrystallization from alcohol it melts at 175–176° C.

*Example 7*

13.8 grams of sodium in small pieces are added to 200 cc. of benzyl-cyanide and 63.3 grams of 2-secondary butyl - 3 - amino - 4 - carbethoxy-pyrazole are then added. The mixture is heated within about 30 minutes to 110–120° C. and stirred at the same temperature for another 5 hours, allowed to cool, treated with absolute alcohol and evaporated under vacuum. The residue is treated with dilute sodium hydroxide solution and extracted with chloroform. The alkaline aqueous solution is treated with active carbon and filtered. The clear filtrate is adjusted with 5 N-hydrochloric acid to pH=6, whereupon 1 - secondary butyl - 4-hydroxy-6-benzyl-pyrazolo[3,4-d]-pyrimidine of the formula

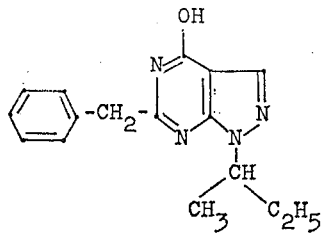

settles out; after recrystallization from alcohol it melts at 154–155° C.

*Example 8*

9.2 grams of sodium in small pieces and then 47.4 grams of 2 - cyclohexyl - 3-amino-4-carbethoxy-pyrazole are added to 130 cc. of benzyl cyanide. The mixture is heated within about 30 minutes to 110–120° C. and stirred on at the same temperature for 5 hours, allowed to cool, treated with absolute alcohol and evaporated under vacuum. The residue is mixed with dilute sodium hydroxide solution and extracted with chloroform. The alkaline aqueous solution is treated with active carbon and filtered. The clear filtrate is adjusted with 5 N-hydrochloric acid to pH=6, whereupon 1-cyclohexyl-4-hydroxy-6-benzyl-pyrazolo[3,4-d]pyrimidine of the formula

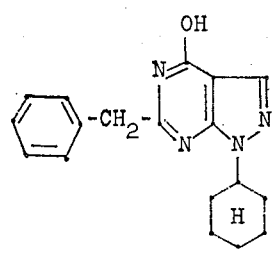

settles out; after recrystallization from alcohol it melts at 207–208° C.

*Example 9*

4.6 grams of sodium and then 17 grams of 2-(3'-pentyl)-3-amino-4-carbethoxy-pyrazole are added to 66 cc. of benzyl cyanide. The mixture is heated within about 30 minutes to 110–120° C. and then stirred on for 5 hours at the same temperature, allowed to cool, treated with absolute alcohol and evaporated under vacuum. The residue is treated with dilute sodium hydroxide solution and extracted with chloroform. The alkaline aqueous solution is treated with active carbon and filtered. The clear filtrate is adjusted with 5 N-hydrochloric acid to pH=6, whereupon 1-(3'-pentyl)-4-hydroxy - 6 - benzyl - pyrazolo[3,4 - d]pyrimidine of the formula

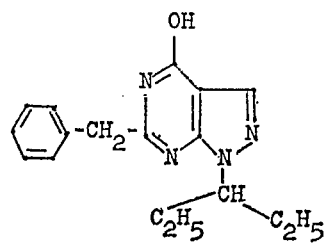

settles out; after recrystallization from absolute alcohol it melts at 144–145° C.

*Example 10*

3.22 grams of sodium and then 15.61 grams of 2-cyclopentyl-3-amino-4-carbethoxy-pyrazole are added to 46 cc. of benzyl cyanide. The mixture is heated within about 30 minutes to 110–120° C. and stirred on for 5 hours at the same temperature, allowed to cool, treated with absolute alcohol and evaporated under vacuum. The residue is treated with dilute sodium hydroxide solution and extracted with chloroform. The alkaline aqueous solution is treated with active carbon and filtered. The clear filtrate is adjusted with 5 N-hydrochloric acid to pH=6, whereupon 1 - cyclopentyl - 4-hydroxy-6-benzyl-pyrazolo-[3,4-d]pyrimidine of the formula

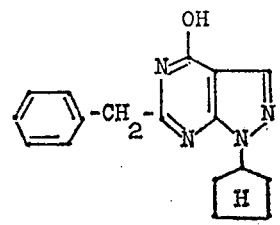

settles out; after recrystallization from absolute alcohol it melts at 189–190° C.

*Example 11*

20.7 grams of sodium in small pieces and then 59.7 grams of 2-(β-hydroxyethyl)-3-amino-4-carbethoxy-pyrazole are added to 250 cc. of benzyl cyanide. The mixture is heated within about 30 minutes to 110–120° C. and stirred on for 5 hours at the same temperature, allowed to cool, treated with absolute alcohol and evaporated under vacuum. The residue is treated with dilute sodium hydroxide solution and extracted with chloroform. The alkaline aqueous solution is treated with active carbon and filtered. The clear filtrate is adjusted with 5 N-hydrochloric acid to pH=4, whereupon 1-(β-hydroxyethyl)-4 - hydroxy - 6 - benzyl-pyrazolo[3,4-d]pyrimidine of the formula

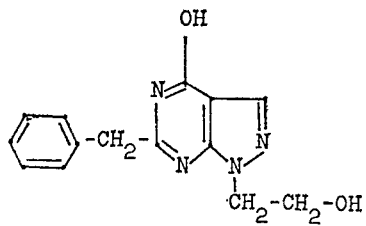

settles out: after recrystallization from alcohol it melts at 194–195° C.

2-(β-hydroxyethyl)-3-amino-4-carbethoxy-pyrazole used as starting material is prepared in the following manner:

101.5 grams of ethoxymethylene cyanoacetic ester and 66 grams of β-hydroxyethyl hydrazine of 70% strength are heated in 700 cc. of alcohol for 10 hours at the boil. The mixture is then evaporated under vacuum and the residue is distilled under vacuum. 2-(β-hydroxyethyl)-3-amino-4-carbethoxy-pyrazole of the formula

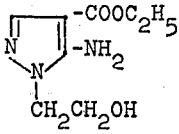

boils at 180° C. under a pressure of 0.6 mm. Hg and melts at 89–91° C.

Example 12

2.3 grams of finely distributed sodium are added to a solution of 9.9 grams of 2-isopropyl-3-amino-4-carbethoxypyrazole in 100 cc. of meta-methoxy-benzyl cyanide. The whole is heated with stirring within 4 hours to 110–120° C., allowed to cool, treated with 100 cc. of alcohol and evaporated to dryness under vacuum. The residue is taken up in 150 cc. of 2 N-sodium hydroxide solution, the alkaline solution is extracted with chloroform to remove the insoluble material and then adjusted with 6 N-hydrochloric acid to pH=6, whereupon a smeary product settles out which is recrystallized from a small amount of alcohol, to yield 1-isopropyl-4-hydroxy-6-(meta-methoxy-benzyl)-pyrazolo[3,4-d]pyrimidine of the formula

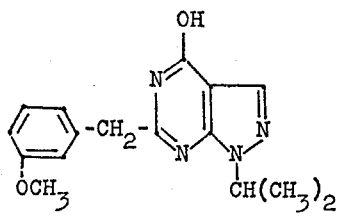

in colorless crystals melting at 155–158° C.

Example 13

2.3 grams of finely distributed sodium are introduced into a melt of 50 grams of para-chlorobenzyl cyanide and 9.9 grams of 2-isopropyl-3-amino-4-carbethoxy-pyrazole. The mixture is then heated for 4 hours at 110–120° C. with stirring, allowed to cool, mixed with 100 cc. of alcohol and evaporated to dryness under vacuum. The residue is taken up in 150 cc. of 2 N-sodium hydroxide solution, the alkaline solution is freed from the undissolved material by extraction with chloroform and then adjusted with 6 N-hydrochloric acid to pH=5–6, whereupon a solid product precipitates which is recrystallized from alcohol, to yield 1-isopropyl-4-hydroxy-6-parachlorobenzyl-pyrazolo[3,4-d]pyrimidine of the formula

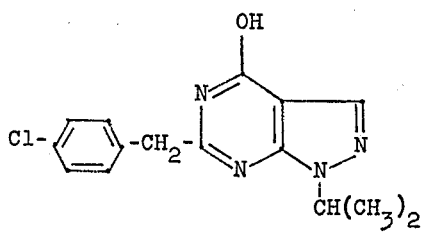

in colorless crystals melting at 181–182° C.

Example 14

2.3 grams of finely distributed sodium are introduced while cooling with water into a solution of 9.9 grams of 2-isopropyl - 3-amino-4 - carbethoxypyrazole in 100 grams of propionitrile. On completion of the exothermic reaction the mixture is stirred while being heated for 4 hours at 100–110° C., allowed to cool, then treated with 100 cc. of alcohol and evaporated to dryness under vacuum. The residue is taken up in 150 cc. of 2 N-sodium hydroxide solution: the alkaline solution is freed from undissolved matter by extraction with chloroform and then adjusted to pH 6 with 6 N-hydrochloric acid, whereupon a smeary product separates out which is recrystallized from alcohol, to yield the 1-isopropyl-4-hydroxy-6-ethyl-pyrazolo[3,4-d]pyrimidine of the formula

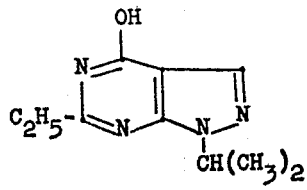

in colorless crystals melting at 180 to 182° C.

Example 15

2.3 grams of sodium in small pieces are added to 15 grams of 2-[1'-ethoxy-butyl - (3')-3-amino-4-carbethoxy-pyrazole and 50 grams of benzyl cyanide and the whole is heated with stirring within 4 hours to 100–110° C., allowed to cool, treated with 150 cc. of ethanol and evaporated to dryness under vacuum; the residue is treated with 150 cc. of 2 N-sodium hydroxide solution and extracted with chloroform. The aqueous solution is acidified with hydrochloric acid and extracted with chloroform, dried and evaporated and the residue is crystallized from aqueous methanol, to yield 1-[1'-ethoxy-butyl-(3)]-4-hydroxy-6 - benzyl-pyrazolo[3,4-d]pyrimidine of the formula

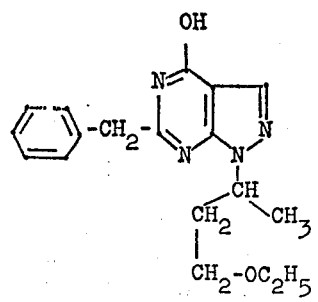

in crystals melting at 111–112° C.

2-[1'-ethoxy-butyl-(3')]-3-amino-4-carbethoxy-pyrazole used as starting material is prepared in the following manner:

A mixture of 50 grams of 1-ethoxy-butyl-(3)-hydrazine and 70 grams of ethoxymethylene cyanoacetic ester is boiled for 3 hours in 40 cc. of alcohol, evaporated under vacuum and the residue is distilled in a high vacuum. The aforementioned compound boils at 120–125° C under 0.1 mm. Hg pressure.

Example 16

2.3 grams of sodium are added to a mixture of 8.5 grams of 2-methyl-3-amino-4-carbethoxy-pyrazole and 50 grams of para-chlorobenzyl cyanide, the whole is heated for 4 hours at 110° C., allowed to cool, treated with 150 cc. of ethanol and evaporated under vacuum. The residue is treated with 150 cc. of 2 N-sodium hydroxide solution and extracted with chloroform. The aqueous solution is filtered and adjusted with 2 N-hydrochloric acid to pH=5–6, whereupon 1-methyl-4-hydroxy-6-para-chlorobenzyl-pyrazolo[3,4-d]pyrimidine of the formula

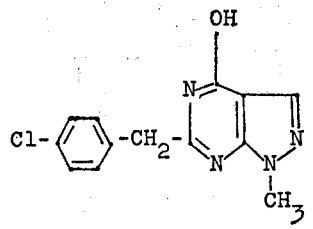

settles out; after recrystallization from aqueous dimethyl formamide it melts at 268–270° C.

*Example 17*

2.3 grams of sodium in small pieces are added to a mixture of 8.5 grams of 2-methyl-3-amino-4-carbethoxy-pyrazole and 50 grams of 2:3-dimethoxy-benzyl cyanide. The mixture is heated for 4 hours at 110° C., allowed to cool, treated with 100 cc. of methanol and evaporated to dryness. The residue is treated with 100 cc. of 2 N-sodium hydroxide solution and extracted with chloroform. On addition of 2 N-hydrochloric acid to the alkaline aqueous solution, 1-methyl - 4-hydroxy-6-(2′,3′-dimethoxy-phenyl-methyl)-pyrazolo[3,4-d]pyrimidine of the formula

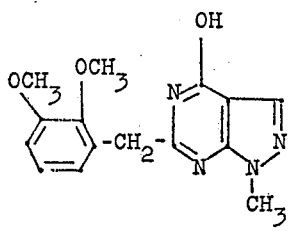

settles out; after recrystallization from alcohol it melts at 190–191° C.

*Example 18*

2.3 grams of sodium in small pieces are added to a mixture of 12 grams of 2-phenyl-3-amino-4-carbethoxy-pyrazole atnd 50 grams of benzyl cyanide and the whole is heated with stirring for 4 hours at 140° C., allowed to cool, treated with 100 cc. of alcohol and adjusted with 2 N-hydrochloric acid to pH=5–6. The resulting precipitate is recrystallized from chloroform+petroleum ether to yield 1-phenyl-4-hydroxy-6-benzyl-pyrazolo[3,4-d]pyrimidine of the formula

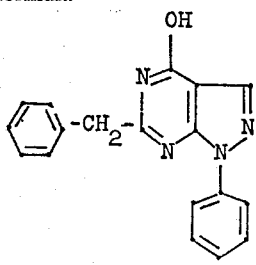

in colorless crystals melting at 264–265° C.

*Example 19*

2.3 grams of sodium in small pieces are added to a mixture of 12 grams of 2-phenyl-3-amino-4-carbethoxy-pyrazole and 50 grams of meta-methoxy-benzyl cyanide and the whole is heated with stirring for 4 hours at 110° C., allowed to cool, treated with 100 cc. of alcohol and adjusted with 2 N-hydrochloric acid to pH=5–6. The resulting precipitate is recrystallized from chloroform+petroleum ether to yield 1-phenyl-4-hydroxy-6-(meta-methoxybenzyl)-pyrazolo[3,4-d]pyrimidine of the formula

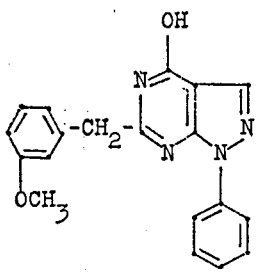

in colorless crystals melting at 235° C.

*Example 20*

2.3 grams of sodium in small pieces are added to a mixture of 12 grams of 2-α-pyridyl-3-amino-4-carbethoxy-pyrazole and 50 grams of benzyl cyanide. The mixture is then heated for 4 hours at 110° C., allowed to cool, treated with 50 cc. of ethanol and evaporated to dryness. The residue is treated with 100 cc. of 2 N-sodium hydroxide solution and extracted with chloroform. On addition of 2 N-hydrochloric acid to the alkaline aqueous solution 1 - α-pyridyl-4-hydroxy-6-benzyl - pyrazole[3,4-d]pyrimidine of the formula

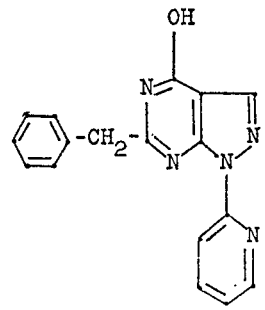

settles out which is purified by recrystallization from dimethyl formamide. It melts above 360° C.

2 - α - pyridyl-3-amino-4-carbethoxy-pyrazole used as starting material is prepared in the following manner:

A mixture of 35 grams of 2-hydrazino-pyridine, 55 grams of ethoxymethylene-cyanoacetic ester and 200 cc. of ethanol is refluxed for 6 hours. The solvent is distilled off under vacuum. The solid reside obtained is recrystallized from alcohol, to yield the above-mentioned compound in crystals melting at 95–96° C.

*Example 21*

39.6 grams of 2-isopropyl-3-amino-4-carbethoxy-pyrazole and 9.2 grams of finely distributed sodium are introduced into 160 cc. of isobutyronitrile. Within 1 hour the mixture is heated to 110° C., stirred for 4 hours at this temperature, and then allowed to cool. 15 cc. of ethanol are added, the whole is evaporated to dryness under vacuum, and the residue is taken up in 100 cc. of 2 N-sodium hydroxide solution, and the alkaline solution is extracted by being shaken with chloroform. The aqueous phase is adjusted to pH 5–6 with 5 N-hydrochloric acid, whereupon a solid product precipitates which is repeatedly recrystallised from ethanol, to yield the 1-isopropyl-4-hydroxy-6-isopropyl-pyrazolo[3:4-d]pyrimidine of the formula

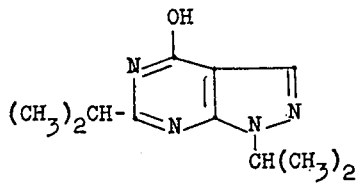

in white crystals melting at 175–177° C.

*Example 22*

2.3 grams of sodium are added while cooling with ice to a solution of 9.9 grams of 2-isopropyl-3-amino-4-carbethoxypyrazole in 50 cc. of acetonitrile. The temperature must not be allowed to rise above 30° C. during the reaction. On completion of the exothermic reaction the mixture is heated for 4 hours at 90 to 95° C., then allowed to cool, treated with 100 cc. of ethanol and evaporated to dryness under vacuum. The residue is treated with 150 cc. of 2 N-sodium hydroxide solution, and the excess acetonitrile is extracted with chloroform. The aqueous phase is adjusted to pH 3–4 with 5 N-hydrochloric acid; after prolonged standing a solid precipitate forms which is filtered off and recrystallised from ethanol, to yield the 1 isopropyl - 4-hydroxy-6-methylpyrazolo[3:4-d]pyrimidine of the formula

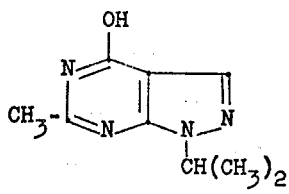

is white crystals melting at 195–196° C.

Example 23

4.6 grams of finely distributed sodium and 15.5 grams of 3-amino-4-carbethoxy-pyrazole are added to 100 cc. of benzyl cyanide. The mixture is heated with stirring for 4 hours at 110–120° C., allowed to cool, treated with 150 cc. of ethanol and evaporated to dryness under vacuum. The residue to taken up in 150 cc. of 2 N-sodium hydroxide solution, the alkaline solution is agitated with chloroform to remove any undissolved material and then adjusted with 6 N-hydrochloric acid to pH 4–5, whereupon a solid product precipitates which is recrystallized from much ethanol, to yield 4-hydroxy-6-benzyl-pyrazolo-[3,4-d]pyrimidine of the formula

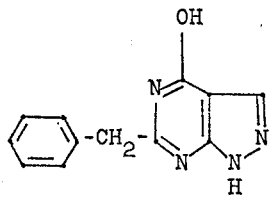

is colorless crystals melting at 290–292° C.

Example 24

19.8 grams of 2-isopropyl-3-amino-4-carbethoxypyrazole and 4.6 grams of finely distributed sodium are introduced into 100 cc. of isovaleronitrile. Within 1 hour the mixture is cautiously heated to 110° C., maintained for 4 hours at this temperature, allowed to cool, treated with 150 cc. of ethanol and evaporated to dryness in vacuum. The residue is taken up in 150 cc. of 2 N-sodium hydroxide solution, the alkaline solution is extracted with chloroform to remove the undissolved matter and then adjusted to pH 4–5 with 6 N-hydrochloric acid, whereupon a solid precipitate forms which is recrystallised from ethanol, to yield the 1-isopropyl-4-hydroxy-6-(2'-methyl-propyl)-pyrazolo[3,4-d]pyrimidine of the formula

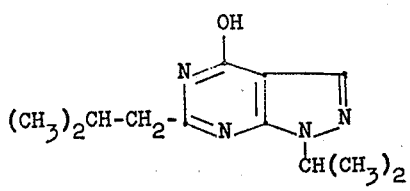

in white crystals melting at 114–116° C.

Example 25

A mixture of 40 grams of ortho-methoxybenzyl cyanide and 9.9 grams of 2-isopropyl-3-amino-4-carbethoxy-pyrazole is heated to 60° C. and 2.3 grams of sodium in small pieces are then added. The mixture is heated for 4 hours at 110–120° C., allowed to cool, the excess sodium is destroyed with ethanol and the whole is evaporated to dryness under vacuum. The residue is taken up in 200 cc. of 2 N-sodium hydroxide solution and extracted with 200 cc. of chloroform to remove the excess orth-methoxybenzyl cyanide. The alkaline aqueous solution is treated with active carbon and filtered. The clear filtrate is adjusted with 5 N-hydrochloric acid to pH 6, whereupon 1 - isopropyl -4- hydroxy-6-(ortho-methoxybenzyl)-pyrazolo[3,4-d]pyrimidine of the formula

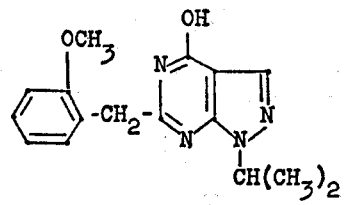

settles out; after recrystallization from ethanol it melts at 157–159° C.

Example 26

A mixture of 50 grams of 2-methyl-3-methoxybenzyl cyanide and 9.9 grams of 2-isopropyl-3-amino-4-carbethoxypyrazole is heated to 60° C. and 2.3 grams of sodium in small pieces are then added. The mixture is heated for 4 hours at 110–120° C., allowed to cool, the excess sodium is destroyed with ethanol and the reaction mixture is evaporated to dryness under vacuum. The residue is taken up in 200 cc. of 2 N-sodium hydroxide solution and extracted with 200 cc. of chloroform to remove the excess 2-methyl-3-methoxybenzyl cyanide. The alkaline aqueous solution is treated with active carbon and filtered. The clear filtrate is adjusted with 5 N-hydrochloric acid to pH 6, whereupon 1 - isopropyl - 4 - hydroxy-6-(2'-methyl-3'-methoxyphenyl-methyl)-pyrazolo[3,4-d]pyrimidine of the formula

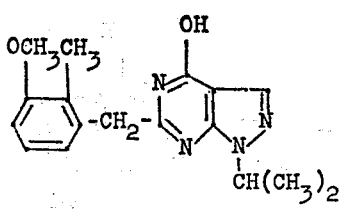

settles out; after recrystallization from ethanol it melts at 150–151° C.

Example 27

A mixture of 20 grams of diphenyl acetonitrile and 19.7 grams of 2-isopropyl-3-amino - 4 - carbethoxy-pyrazole is heated to 70° C. and 2.3 grams of sodium in small pieces are then added. The mixture is heated for 4 hours at 110–120° C., allowed to cool, the excess sodium is destroyed with ethanol and the mixture is evaporated to dryness under vacuum. The residue is treated with 300 cc. of water and the whole is adjusted with 2 N-hydrochloric acid to pH 3, whereupon a solid precipitate settles out which is suctioned off, boiled with much petroleum ether to remove the residual starting material and the material that did not dissolve in petroleum ether is recrystallized from ethanol, to yield 1-isopropyl-4-hydroxy-6 - diphenylmethyl - pyrazolo[3,4 - d]pyrimidine of the formula

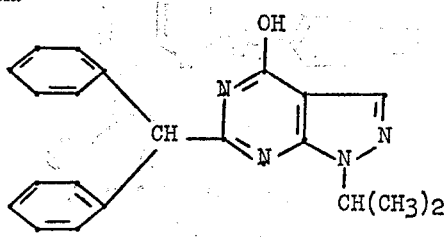

in white crystals melting at 226–227° C.

Example 28

2.3 grams of finely distributed sodium and 11.45 grams of 2-[3'-methyl-butyl-(2')]-3-amino-4-carbethoxy- pyrazole are added to 50 cc. of benzyl cyanide. The mixture is heated with stirring for 4 hours at 110–120° C., allowed to cool, treated with 100 cc. of ethanol and evaporated to dryness under vacuum. The residue is taken up in 150 cc. of 2 N-sodium hydroxide solution, the alkaline solution is agitated with chloroform to remove the undissolved material and then adjusted with 6 N-hydrochloric acid to pH 3; a solid product precipitates which is recrystallized from a little ethanol, to yield 1-[3'-methyl-butyl-(2')-]-4-hydroxy-6-benzyl - pyrazolo[3,4 - d] - pyrimidine of the formula

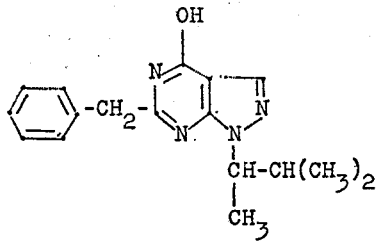

in colorless crystals melting at 157–158° C.

*Example 29*

A solution of 13 grams of 1-isopropyl-4-hydroxy-6-benzyl-pyrazolo[3,4-d]pyrimidine in 100 cc. of concentrated sulfuric acid is slowly treated with stirring at 0–5° C. with 50 cc. of concentrated nitric acid. The mixture is kept for 3 hours at room temperature, the reaction solution is poured over ice, the precipitate is suctioned off and repeatedly recrystallized from ethanol, to yield 1-isopropyl-4-hydroxy-6-(para - nitrobenzyl) - pyrazolo[3,4 - d] pyrimidine of the formula

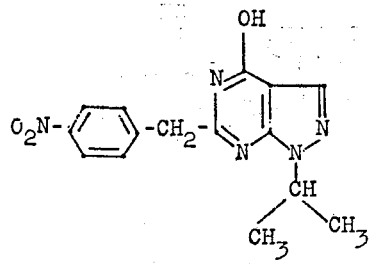

in yellowish crystals melting at 196–198° C.

*Example 30*

A solution of 15.6 grams of 1-isopropyl-4-hydroxy-6-para-nitrobenzyl-pyrazolo[3,4-d]pyrimidine in 500 cc. of ethanol is hydrogenated at room temperature with 4 grams of nickel catalyst. The calculated amount of hydrogen is absorbed within 10 hours. The catalyst is suctioned off, the filtrate is evaporated to dryness under vacuum and the residue crystallized from ethanol, to yield 1-isopropyl-4-hydroxy-6-(para - aminobenzyl)-pyrimidine of the formula

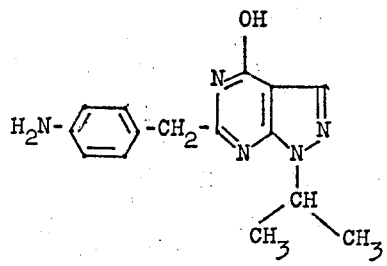

in colorless crystals melting at 211–212° C.

*Example 31*

9.2 grams of sodium and then 42.2 grams of 2-secondary butyl-3-amino-4-carbethoxypyrazole are added to 130 cc. of isobutyronitrile. Within about 30 minutes the mixture is heated to 110–120° C., stirred for 5 hours at this temperature and then allowed to cool, treated with absolute ethanol and evaporated in vacuum. The residue is treated with dilute sodium hydroxide solution and extracted with chloroform. The alkaline aqueous solution is treated with active carbon and filtered. The clear filtrate is adjusted to pH 6, whereupon the 1-secondary butyl-4-hydroxy-6-isopropyl - pyrazolo[3:4 - d]pyridimine of the formula

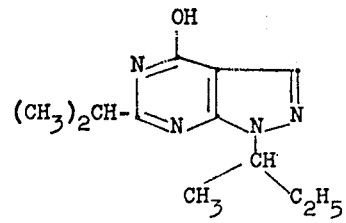

separates out. After recrystallisation from ether+petroleum ether it melts at 146–148° C.

*Example 32*

9.2 grams of sodium and then 42.4 grams of 2-secondary butyl-3-amino-4-carbethoxypyrazole are added to 130 cc. of isovaleronitrile. The mixture is slowly heated to 110–120° C., stirred for 5 hours at this temperature and then allowed to cool, treated with absolute ethanol and evaporated in vacuum. The residue is treated with dilute sodium hydroxide solution and extracted with chloroform. The alkaline aqueous solution is treated with active carbon and filtered. The clear filtrate is adjusted to pH 6 with 5 N-hydrochloric acid, and the residue is recrystallised from ether+petroleum ether, to yield the 1-secondary butyl-4-hydroxy-6-(2'-methyl - propyl)-pyrazolo[3:4-d]pyrimidine of the formula

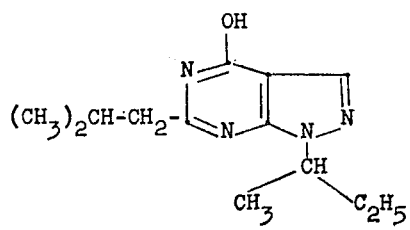

melting at 115–116° C.

*Example 33*

1.65 grams of sodium are added to 50 cc. of anhydrous toluene and the mixture is heated with vigorous stirring to 120° C., and at the same temperature a solution of 7 grams of 2-isopropyl-3-amino-4-carbethoxy-pyrazole in 14 grams of benzyl cyanide is slowly added dropwise. The mixture is heated with stirring within 5 hours to 130° C., allowed to cool, treated with 24 cc. of alcohol and evaporated to dryness under vacuum. The residue is taken up in 100 cc. of 2 N-sodium hydroxide solution, the alkaline solution is extracted with toluene to remove the undissolved material and then adjusted with 6 N-hydrochloric acid to pH 5–6, whereupon a solid product precipitates which is recrystallized from a small amount of alcohol, to yield 1-isopropyl-4-hydroxy-6-benzyl-pyrazolo[3:4-d]pyrimidine in colorless crystals melting at 165–166° C.

*Example 34*

A mixture of 8 grams of 2-isopropyl-3-amino-4-carbamyl-pyrazole and 20 grams of phenylacetic acid amide is heated for 4 hours in a bath maintained at 200–210° C., then allowed to cool and the crystalline residue is pulverized, extracted iwth 2 N-sodium hydroxide solution, treated with Norit and precipitated by adjusting the reaction mixture with 2 N-hydrochloric acid to pH 3. The precipitated product is recrystallised from alcohol to yield 1-isopropyl-4-hydroxy-6-benzyl-pyrazolo[3:4-d] pyrimidine in colorless crystals melting at 165–166° C.

*Example 35*

Dry hydrochloric acid is introduced at −10° C. into 26.3 grams of benzyl cyanide in 250 cc. of chloroform and 13 cc. of alcohol until the reaction solution is saturated; the latter is then allowed to stand overnight at room temperature and is then evaporated at a maximum temperature of 30° C. The residue containing the imino ether hydrochloride is dissolved in 200 cc. of chloroform, a suspension of 16.9 grams of 2-isopropyl-3-amino-4-carbonamido-pyrazole in 1800 cc. of chloroform is added, and the whole boiled under reflux for 10 hours with stirring. Any undissolved material is filtered off, and the filtrate evaporated to dryness. The residue consists of crude 2-isopropyl-3-(α-ethoxy-β-phenyl-ethylidene-amino)-pyrazole-4-carboxylic acid amide of the formula

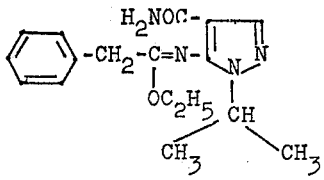

(a) The amide is heated for 10 hours at 180° C. The residue is extracted with 2 N-sodium hydroxide solution and chloroform. The aqueous alkaline portion is adjusted to pH 6 with 6 N-hydrochloric acid, whereupon 1 - isopropyl - 4 - hydroxy - 6 - benzyl - pyrazolo[3,4 - d]pyrimidine described in Example 1 precipitates.

(b) 62 grams of the above described amide are boiled under reflux for 30 minutes with a solution of 18 grams of sodium in 315 cc. of methanol. The reaction solution is filtered, evaporated and the residue extracted with water and chloroform. The aqueous alkaline solution is made neutral with 6 N-hydrochloric acid, whereupon 1 - isopropyl - 4 - hydroxy - 6 - benzyl - pyrazolo[3,4 - d]pyrimidine described in Example 1 precipitates.

*Example 36*

5.4 grams of 1-isopropyl-4-oxo-6-benzyl[3,4-d]oxazine are heated with 50 cc. of benzene and 15 cc. of liquid ammonia at 100–110° C. for 8 hours in a sealed tube.

2 N-sodium hydroxide solution is added to the reaction product and the benzene solution is separated off. The aqueous alkaline solution is adjusted to pH 6 with 6 N-hydrochloric acid, whereupon 1-isopropyl-4-hydroxy-6-benzyl-pyrazolo[3,4-d]pyrimidine precipitates.

The 1-isopropyl-4-oxo-6-benzyl-pyrazolo[3,4-d]oxazine used as starting material is prepared as follows:

A solution of 77.3 grams of phenylacetic acid chloride in 125 cc. of dioxane is added dropwise to 84.5 grams of 2-isopropyl-3-amino-4-carboxy-pyrazole in 375 cc. of absolute dioxane and 40 cc. of pyridine at a temperature between 10 and 15° C. with stirring. When the addition is complete, the mixture is stirred for one hour at 10° C. and a further two hours at room temperature. For the purpose of working up, water and dilute hydrochloric acid are added and the reaction solution extracted with ether. The etheral solution is dried and evaporated. The residue is scratched with a glass rod in water and recrystallized from a mixture of acetone and petroleum ether. There is obtained 2-isopropyl-3-(phenyl-acetyl-amino)-4-carboxy-pyrazole of the formula

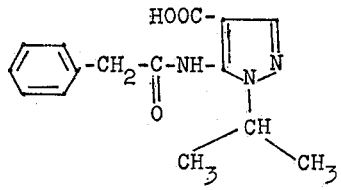

melting at 163–164° C.

8.6 grams of 2-isopropyl-3-(phenyl-acetylamino)-4-carboxy-pyrazole are heated with 30 cc. of acetic anhydride at 100–110° C. for 3 hours with stirring. The reaction solution is evaporated, the residue recrystallized from a mixture of ether and petroleum ether. There is obtained 1-isopropyl-4-oxo-6-benzyl-pyrazolo[3,4-d]oxazine of the formula

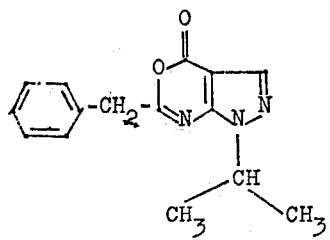

melting at 100–101° C.

*Example 37*

A solution of 46.5 grams of phenylacetic acid chloride in 75 cc. of dioxane is added dropwise and with stirring to 45 grams of 2-isopropyl-3-amino-4-cyanopyrazole in 325 cc. of absolute dioxane and 24 cc. of pyridine at a temperature between 10 and 15° C. When the addition is complete, the reaction solution is stirred for 1 hour at 10° C. and for a further 2 hours at room temperature. After the addition of 100 cc. of water and 200 cc. of 2 N-hydrochloric acid, 2-isopropyl-3-(phenylacetyl-amino)-4-pyrazole-carboxylic acid nitrile of the formula

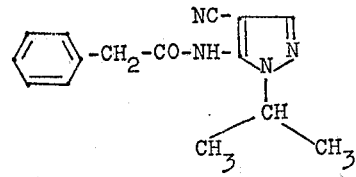

crystallizes out.

7.05 grams of 2-isopropyl-3-(phenyl-acetylamino)-4-pyrazole-carboxylic acid nitrile are heated for 10 hours with 27.2 cc. of potassium hydroxide solution of 10% strength and 102 cc. of hydrogen peroxide of 3% strength. The reaction solution is then filtered and acidified with 2 N-hydrochloric acid to pH 5, whereupon 1-isopropyl-4-hydroxy-6-benzyl-pyrazolo[3,4-d]pyrimidine precipitates.

*Example 38*

16.5 grams of sodium are finely pulverized in 120 cc. of toluene in a sulfurating flask of 750 cc. of capacity at a bath temperature of 130° C. 240 cc. of benzene free from thiophene are added. To the solution boiling at a constant temperature of 89° C. there are added dropwise 70 grams of 2-isopropyl-3-amino-4-carbethoxy-pyrazole in 140 grams of benzyl cyanide in the course of 2½ hours at a bath temperature of 120° C. and an internal temperature of 88–90° C. When the addition is complete, stirring is continued for 10 hours under reflux.

For working up, there are added 250 cc. of absolute alcohol and the solution is evaporated to dryness. The residue is taken up in 1.2 liters of N-sodium hydroxide solution and extracted three times with 200 cc. of toluene. The alkaline solution is adjusted to pH 5–6 with 5 N-hydrochloric acid; the crystalline precipitate is filtered off.

The crystalline filter residue is dissolved in 340 cc. of alcohol. The solution is treated with carbon and filtered. With ice-cooling 1-isopropyl-4-hydroxy-6-benzyl-pyrazolo[3,4-d]pyrimidine crystallizes out.

*Example 39*

A mixture of 19.7 grams of 2-isopropyl-3-amino-4-carbethoxy-pyrazole and 49.5 grams of α-phenyl-butyronitrile is added to 4.6 grams of pulverized sodium in 85 cc. of absolute toluene at a temperature of 90–95° C. with stirring. Stirring is then continued for 5 hours at 90–95° C. For the pupose of working up, 50 cc. of alcohol are added and the reaction mixture evaporated to dryness. The residue is extracted with N-sodium hydroxide solution and toluene. The aqueous alkaline solution is adjusted to pH 6 with 6 N-hydrochloric acid, whereupon 1- isopropyl - 4 - hydroxy - 6 - (α-phenyl-propyl - pyrazolo [3,4-d]-pyrimidine of the formula

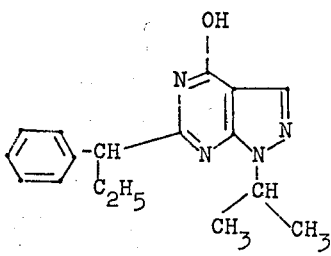

precipitates which, after recrystallization from alcohol, melts at 142–143° C.

*Example 40*

A solution of 19.7 grams of 2-isopropyl-3-amino-4-carbethoxy-pyrazole and 45 grams of β-phenyl-propionitrile in 30 cc. of absolute toluene is added to 4.6 grams of pulverized sodium in 85 cc. of absolute toluene with stirring at a temperature of 90–95° C. Stirring is then continued for 5 hours at 90–95° C. For the purpose of working up, 50 cc. of alcohol are added and the reaction solution is evaporated to dryness. The residue is extracted with N-sodium hydroxide solution and toluene. The aqueous alkaline solution is neutralized with 6 N-hydrochloric acid, whereupon 1-isopropyl-4-hydroxy-6-(β-phenyl-ethyl)-pyrazolo[3,4-d]pyrimidine of the formula

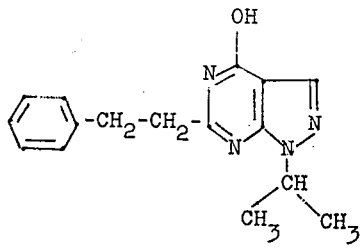

precipitated which, after recrystallization from alcohol melts at 124–125° C.

*Example 41*

1-isopropyl-4-hydroxy-6 - benzyl - pyrazolo[3,4-d]-pyrimidine is made up in the usual manner into tablets containing:

| | Mg. |
|---|---|
| 1-isopropyl-4-hydroxy-6-benzyl-pyrazolo[3,4-d]pyrimidine | 10 |
| Lactose | 35 |
| Non-swellable starch | 20 |
| Wheat starch | 10 |
| Aerosil | 10 |
| Arrowroot | 12 |
| Magnesium stearate | 0.5 |
| Talc | 6 |

What we claim is:

1. A member selected from the group of pyrazolo[3,4-d]-pyrimidines of the formula

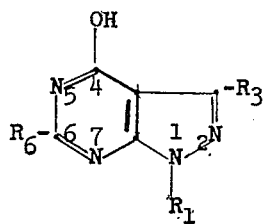

their tautomers, and the therapeutically acceptable alkali metal salts thereof, in which $R_1$ stands for a member selected from the group consisting of hydrogen, lower alkyl, hydroxy-lower alkyl, halogen-lower alkyl, lower alkoxy-lower alkyl, cyclo-lower alkyl, cyclo-lower alkyl-lower alkyl, phenyl, lower alkyl-phenyl, lower alkoxy-phenyl, methylenedioxy-phenyl, hydroxy-phenyl, nitro-phenyl, mono-lower alkylamino-phenyl, di-lower alkyl-amino-phenyl, halogeno-phenyl, trifluoro-methyl-phenyl, $R_3$ for a member selected from the group consisting of hydrogen and lower alkyl and $R_6$ for a member selected from the group consisting of phenyl-lower alkyl, (lower alkyl-phenyl)-lower alkyl, (halogeno-phenyl)-lower alkyl, (lower alkoxy-phenyl)-lower alkyl, (amino-phenyl)-lower alkyl, (mono-lower alkyl-amino-phenyl)-lower alkyl, (di-lower alkyl-amino-phenyl)-lower alkyl, (nitro-phenyl)-lower alkyl, (hydroxy-phenyl)-lower alkyl, (methylene-dioxy-phenyl)-lower alkyl, and (trifluoromethyl-phenyl)-lower alkyl.

2. A pyrazolo[3,4-d]pyrimidine of the formula

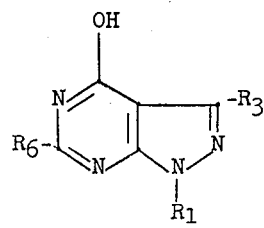

in which $R_1$ stands for lower alkyl, $R_3$ for hydrogen and $R_6$ for benzyl.

3. 1-isopropyl-4-hydroxy - 6 - benzyl-pyrazolo[3,4-d]-pyrimidine.

4. A therapeutically acceptable alkali metal salt of 1-isopropyl-4-hydroxy-6-benzyl-pyrazolo[3,4-d]pyrimidine.

5. 1-isopropyl - 4 - hydroxy-6-(para-chlorobenzyl)-pyrazolo[3,4-d]pyrimidine.

6. 1-isopropyl-4-hydroxy - 6 - (meta-methoxybenzyl)-pyrazolo[3,4-d]pyrimidine.

7. 1-isopropyl - 4 - hydroxy-6-(3',4',5' - trimethoxy-phenylmethyl) pyrazolo[3,4-d]pyrimidine.

8. 1 - pentyl - (3')-4-hydroxy-6-benzyl-pyrazolo[3,4-d]pyrimidine.

9. 1 - methyl - 4 - hydroxy-6-benzyl-pyrazolo[3,4-d]pyrimidine.

10. 1-methyl - 4 - hydroxy-6-(3',4',5' - trimethoxy-phenylmethyl)-pyrazolo[3,4-d]pyrimidine.

11. 1-isopropyl - 4 - hydroxy-6-(para-ethoxybenzyl)-pyrazolo[3,4-d]pyrimidine.

12. 1-(secondary butyl)-4 - hydroxy-6-benzyl-pyrazolo-[3,4-d]pyrimidine.

13. 1 - cyclohexyl - 4 - hydroxy-6-benzyl-pyrazolo[3,4-d]pyrimidine.

14. 1 - cyclopentyl - 4 - hydroxy-6-benzyl-pyrazolo[3,4-d]pyrimidine.

15. 1 - (β-hydroxyethyl)-4-hydroxy-6-benzyl-pyrazolo-[3,4-d]pyrimidine.

16. 1-[1'-ethoxy - butyl - (3')]-4-hydroxy-6-benzyl-pyrazolo[3,4-d]pyrimidine.

17. 1-methyl-4-hydroxy - 6 - (para-chlorobenzyl-pyrazolo[3,4-d]pyrimidine.

18. 1-methyl - 4 - hydroxy-6-(2',3'-dimethoxy-phenyl-methyl)-pyrazolo[3,4-d]pyrimidine.

19. 1-phenyl-4-hydroxy - 6 - benzyl-pyrazolo[3,4-d]-pyrimidine.

20. 1 - phenyl - 4 - hydroxy-6-(meta-methoxybenzyl)-pyrazolo[3,4-d]pyrimidine.

21. 4-hydroxy-6-benzyl-pyrazolo[3,4-d]pyrimidine.

22. 1 - isopropyl-4-hydroxy-6-(ortho-methoxybenzyl)-pyrazolo[3,4-d]pyrimidine.

23. 1 - isopropyl-4-hydroxy-6-(2' - methyl-3'-methoxy-phenyl-methyl)-pyrazolo[3,4-d]pyrimidine.

24. 1 - isopropyl-4-hydroxy - 6-diphenylmethyl-pyrazolo[3,4-d]pyrimidine.

25. 1-[3'-methyl-butyl(2')] - 4 - hydroxy - 6 - benzyl-pyrazolo[3,4-d]pyrimidine.

26. 1-isopropyl-4-hydroxy - 6 - (para - nitrobenzyl)-pyrazolo[3,4-d]pyrimidine.

27. 1-isopropyl-4-hydroxy - 6 - (para-aminobenzyl)-pyrazolo[3,4-d]pyrimidine.

28. 1 - isopropyl-4 - hydroxy-6-(α - phenyl-propyl)-pyrazolo[3,4-d]pyrimidine.

29. 1-isopropyl - 4 - hydroxy - 6 - (β-phenyl-ethyl)-pyrazolo[3,4-d]pyrimidine.

30. A pyrazolo[3,4-d]pyrimidine of the formula

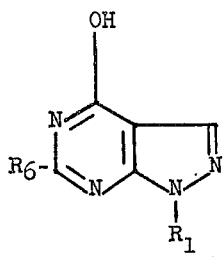

in which $R_1$ stands for phenyl and $R_6$ for benzyl.

31. A pyrazolo[3,4-d]pyrimidine of the formula

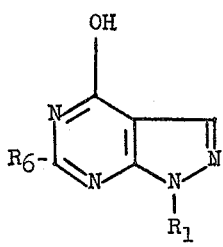

in which $R_1$ stands for cyclo-lower alkyl and $R_6$ for benzyl.

32. A pyrazolo[3,4-d]pyrimidine of the formula

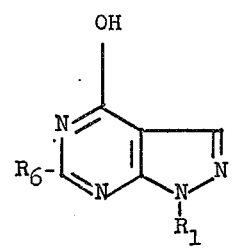

in which $R_1$ stands for hydroxy-lower alkyl and $R_6$ for benzyl.

33. A pyrazolo[3,4-d]pyrimidine of the formula

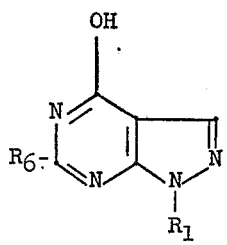

in which $R_1$ stands for lower alkoxy-lower alkyl and $R_6$ for benzyl.

References Cited by the Examiner
UNITED STATES PATENTS

| | | | |
|---|---|---|---|
| 2,868,803 | 1/59 | Druey et al. | 260—310 |
| 2,943,087 | 6/60 | Ohnacker et al. | 260—244 |
| 2,965,643 | 12/60 | Druey et al. | 260—256.4 |
| 2,980,677 | 4/61 | Schmidt et al. | 260—256.4 |
| 2,987,523 | 6/61 | Staub | 260—310 |
| 3,004,025 | 10/61 | Van Campen | 260—244 |

FOREIGN PATENTS

| | | |
|---|---|---|
| 601,981 | 7/60 | Canada. |
| 1,056,613 | 5/59 | Germany. |

OTHER REFERENCES

Cheng et al., J. Org. Chem., vol. 23, p. 191–200 (1958).

Cheng et al., J. Org. Chem., vol. 23, p. 852–861 (1958).

Lowy et al., An Intro. to Org. Chem., John Wiley and Sons, Inc., N.Y., 1945, page 213.

Robins et al., American Chemical Society Abstracts, 128th meeting, pp. 11N–13N (1955).

NICHOLAS S. RIZZO, *Primary Examiner.*

IRVING MARCUS, DUVAL T. McCUTCHEN,
*Examiners.*